US011768426B1

(12) United States Patent
Chen

(10) Patent No.: US 11,768,426 B1
(45) Date of Patent: Sep. 26, 2023

(54) PROJECTION TOY

(71) Applicant: Bingling Chen, Shantou (CN)

(72) Inventor: Bingling Chen, Shantou (CN)

( * ) Notice: Subject to any disclaimer, the term of this patent is extended or adjusted under 35 U.S.C. 154(b) by 19 days.

(21) Appl. No.: 17/711,140

(22) Filed: Apr. 1, 2022

(30) Foreign Application Priority Data

Mar. 9, 2022 (CN) .......................... 202220509197.1

(51) Int. Cl.
*G03B 21/14* (2006.01)
*G03B 21/00* (2006.01)
*G03B 23/10* (2006.01)
*F21Y 115/10* (2016.01)

(52) U.S. Cl.
CPC ......... *G03B 21/145* (2013.01); *G03B 21/001* (2013.01); *G03B 23/105* (2013.01); *F21Y 2115/10* (2016.08)

(58) Field of Classification Search
CPC ...... G03B 21/00; G03B 21/001; G03B 21/02; G03B 21/145; G03B 21/2013; G03B 21/2033; G03B 21/2053; G03B 23/06; G03B 23/08; G03B 23/10; G03B 23/105; H04N 9/3141; H04N 9/3152; H04N 9/3155; H04N 9/3161; H04N 9/3164
See application file for complete search history.

(56) References Cited

U.S. PATENT DOCUMENTS

| 6,328,651 | B1 | 12/2001 | Lebensfeld et al. |
| 7,553,209 | B1 | 6/2009 | Sorensen |
| 9,122,136 | B2 * | 9/2015 | Tang .................... G03B 21/145 |
| 9,914,068 | B2 | 3/2018 | Wood et al. |
| 10,120,270 | B1 * | 11/2018 | Zhang ................ G02B 27/0955 |
| 2010/0296066 | A1 * | 11/2010 | Ou Yang ............... F21V 14/065 |
| | | | 362/249.02 |

* cited by examiner

*Primary Examiner* — Sultan Chowdhury
(74) *Attorney, Agent, or Firm* — True Shepherd LLC; Andrew C. Cheng

(57) ABSTRACT

A projection toy includes a top housing. A bottom housing is fixedly mounted at a top end of the top housing. A projection mechanism is fixedly mounted between the top housing and the bottom housing. A light-emitting diode (LED) lamp panel is fixedly mounted on one side of the projection mechanism between the top housing and the bottom housing. An end, away from the LED lamp panel, of the projection mechanism is clamped in a limiting enclosure. The limiting enclosure is fixedly mounted at one end of a first cover. A second cover is fixedly connected to the first cover. A decorative cover is fixedly mounted on the second cover. The first cover is fixedly mounted at one end of the top housing and one end of the bottom housing on a side away from the decorative cover.

6 Claims, 5 Drawing Sheets

PROJECTION TOY

CROSS-REFERENCE TO RELATED APPLICATIONS

This application claims priority to Chinese Patent Application No. 202220509197.1 with a filing date of Mar. 9, 2022. The content of the aforementioned application, including any intervening amendments thereto, is incorporated herein by reference.

TECHNICAL FIELD

The present disclosure relates to the technical field of toys for children, and in particular, to a projection toy.

BACKGROUND ART

Typically, a projection toy for children is structured with a spot lamp irradiating a negative film or a film pattern to project a shadow on a wall. At night, the projection toy for children may attract children's interest and may also make children's life joyful.

However, existing projection toys for children are often designed with a simple projection structure to perform direct projection, resulting in defects such as unclear projected pattern, short projection distance and small projection area. Moreover, a traditional projection toy for children is usually provided with a film pattern that is mounted in the toy and cannot be replaced. Hence, the toy may become unattractive as time passes.

SUMMARY

An objective of the present disclosure is to provide a projection toy to solve the problems mentioned in the background art. To achieve the above objective, the present disclosure provides the following technical solutions. A projection toy includes a top housing. A bottom housing is fixedly connected to the top housing. A projection mechanism is fixedly mounted between the top housing and the bottom housing. A light-emitting diode (LED) lamp panel is fixedly mounted on one side of the projection mechanism between the top housing and the bottom housing. An end, away from the LED lamp panel, of the projection mechanism is clamped in a limiting enclosure. The limiting enclosure is fixedly mounted at one end of a first cover. A second cover is fixedly connected to the first cover. A decorative cover is fixedly mounted on the second cover. The first cover is fixedly mounted at one end of the top housing and one end of the bottom housing on a side away from the decorative cover.

The projection mechanism includes a first outer shell and a first clamp. Two first clamping grooves are formed in one end of the first outer shell, while two second clamping grooves and two third clamping grooves are formed in the other end of the first outer shell. A rotating groove is formed in a central position of the first outer shell. A plane lens is clamped in each of the two first clamping grooves, while a first convex lens is clamped in each of the two second clamping grooves and a second convex lens is clamped in each of the two third clamping grooves. In the rotating groove, a rotating shaft is fixedly disposed on one side of the first clamp. The rotating shaft fixedly extends through a film rotating disc and a second clamp and is rotatably connected to an inner wall of the rotating groove. The first clamp and the second clamp both extend through a moving opening formed at the top of the top housing and are situated above the top housing.

Specifically, the film rotating disc includes a disc. A plurality of films are embedded in the circular end edge of the disc, and the films correspond to the plane lenses.

Preferably, the adjacent first convex lens and second convex lens are disposed symmetric to each other, and convex ends of the first convex lens and the second convex lens are oriented toward each other.

Preferably, a stop collar is further embedded within the top housing. A power key and a light switching key are embedded within the stop collar. A triggering end of the power key extends through the top housing and is situated outside the top housing.

Preferably, one end, away from the top housing, of the power key is bonded to a power button on an integrated switch circuit board. The light switching key is bonded to a switching button on the integrated switch circuit board. The integrated switch circuit board is fixedly mounted at the bottom of a battery holder by means of a clamping plate. The integrated switch circuit board is electrically connected to a wiring terminal in the battery holder. The integrated switch circuit board is also electrically connected to the LED lamp panel.

Preferably, a top end of the battery holder is fixedly mounted on an inner wall of the bottom housing. A lid matching the battery holder is clamped to the bottom housing.

Preferably, two second convex lenses, two first convex lenses and two plane lenses are symmetrically disposed on two sides of the first outer shell, and axes of each plane lens, each first convex lens and each second convex lens located on a same side of the first outer shell coincide.

Compared with the prior art, the present disclosure has the following beneficial effects:

According to the present disclosure, one side of a convex end of a first convex lens is disposed close to one side of a convex end of a second convex lens such that the intensity of projection can be effectively improved and the distance of projection can be increased. A clear view can be provided for a child in use.

According to the present disclosure, the film rotating disc is rotatably mounted in the first outer shell, and films are capable of rotating around the rotating shaft under the action of the first clamp and the second clamp such that patterns can be directly changed by a user as needed. Thus, improved playability is achieved.

Figure 1:
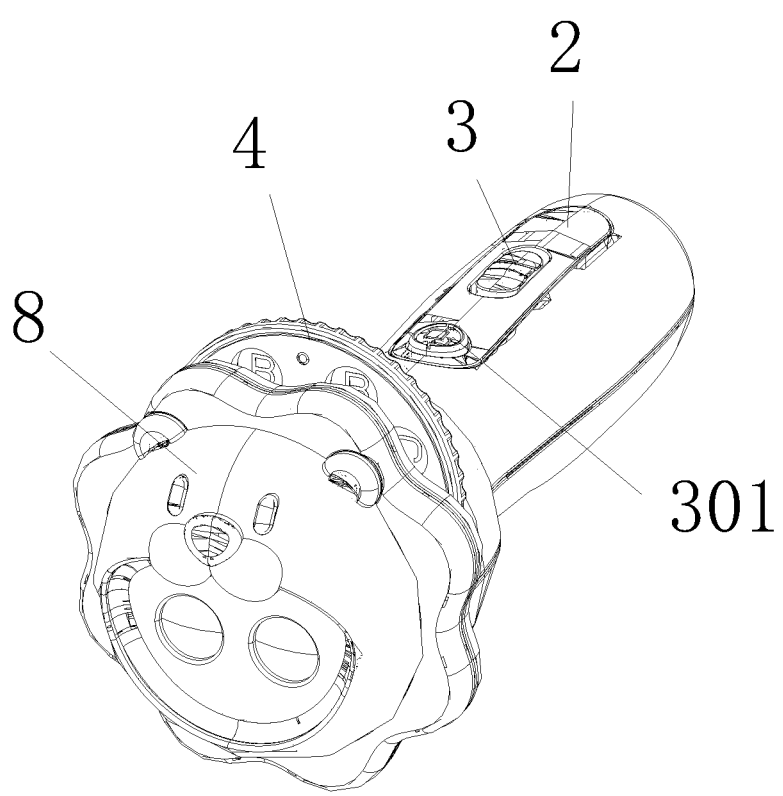
FIG. 1 is an overall structure diagram according to the present disclosure.

List of Reference Numerals: 1—top housing, 101—moving opening, 2—stop collar, 3—power key, 301—light switching key, 4—projection mechanism, 401—first outer shell, 401*a*—first clamping groove, 401*b*—second clamping groove, 401*c*—third clamping groove, 401*d*—rotating groove, 402—plane lens, 403—first convex lens, 404— second convex lens, 405—second outer shell, 406—first clamp, 406a—rotating shaft, 407—film rotating disc, 408—second clamp, 5—limiting enclosure, 6—first cover, 7—second cover, 8—decorative cover, 9—LED lamp panel, 10—integrated switch circuit board, 11—clamping plate, 12—battery holder, 13—bottom housing, and 14—lid.

DETAILED DESCRIPTION OF THE EMBODIMENTS

The technical solutions in embodiments of the present disclosure will be described below clearly and completely with reference to the accompanying drawings in the embodiments of the present disclosure. Apparently, the described embodiments are merely a part, rather than all of the embodiments of the present disclosure. All other embodiments derived from the embodiments in the present disclosure by those of ordinary skill in the art without creative efforts shall fall within the protection scope of the present disclosure.

Figure 2:
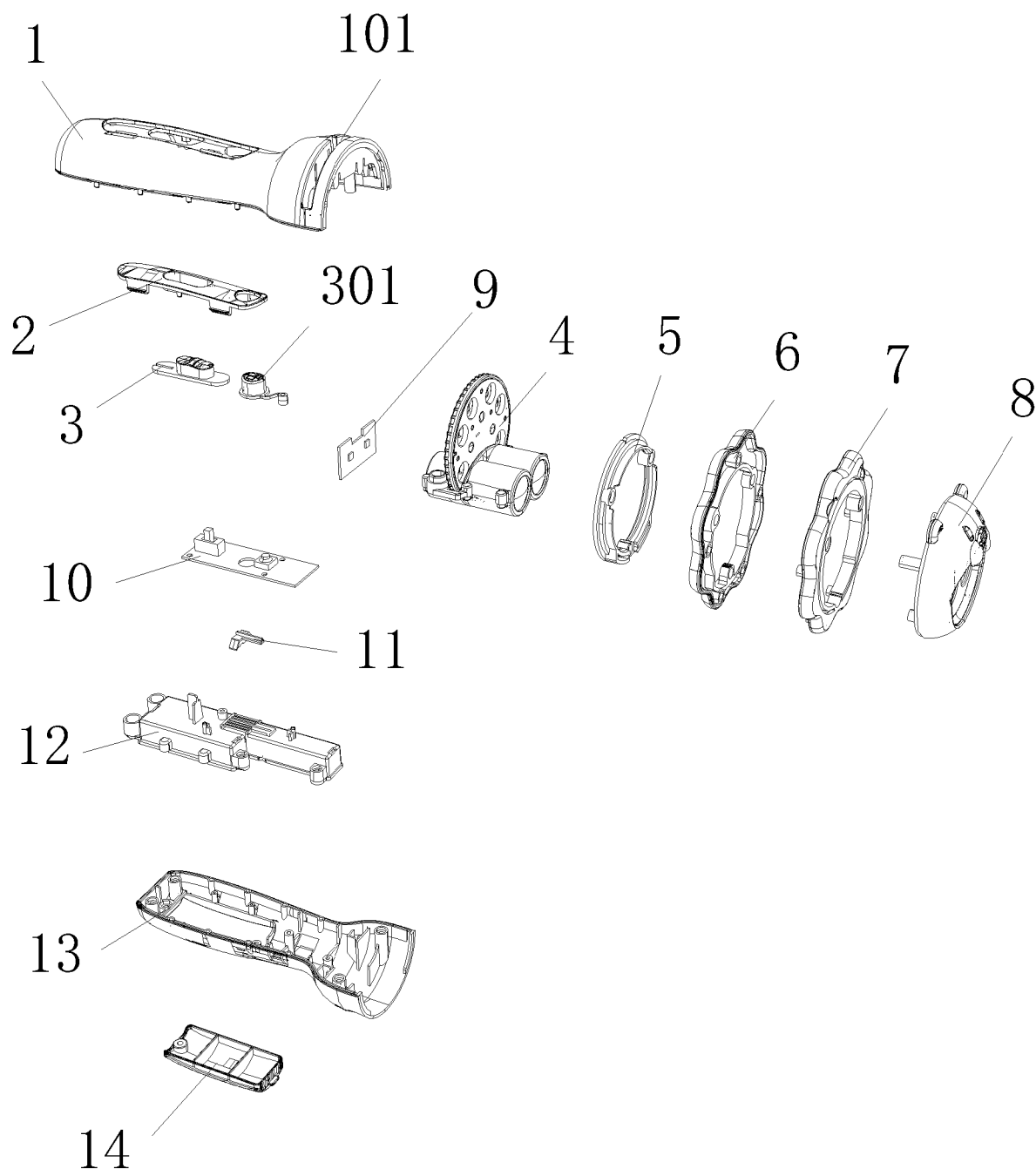
FIG. 2 is an exploded structure diagram according to the present disclosure.
Figure 3:
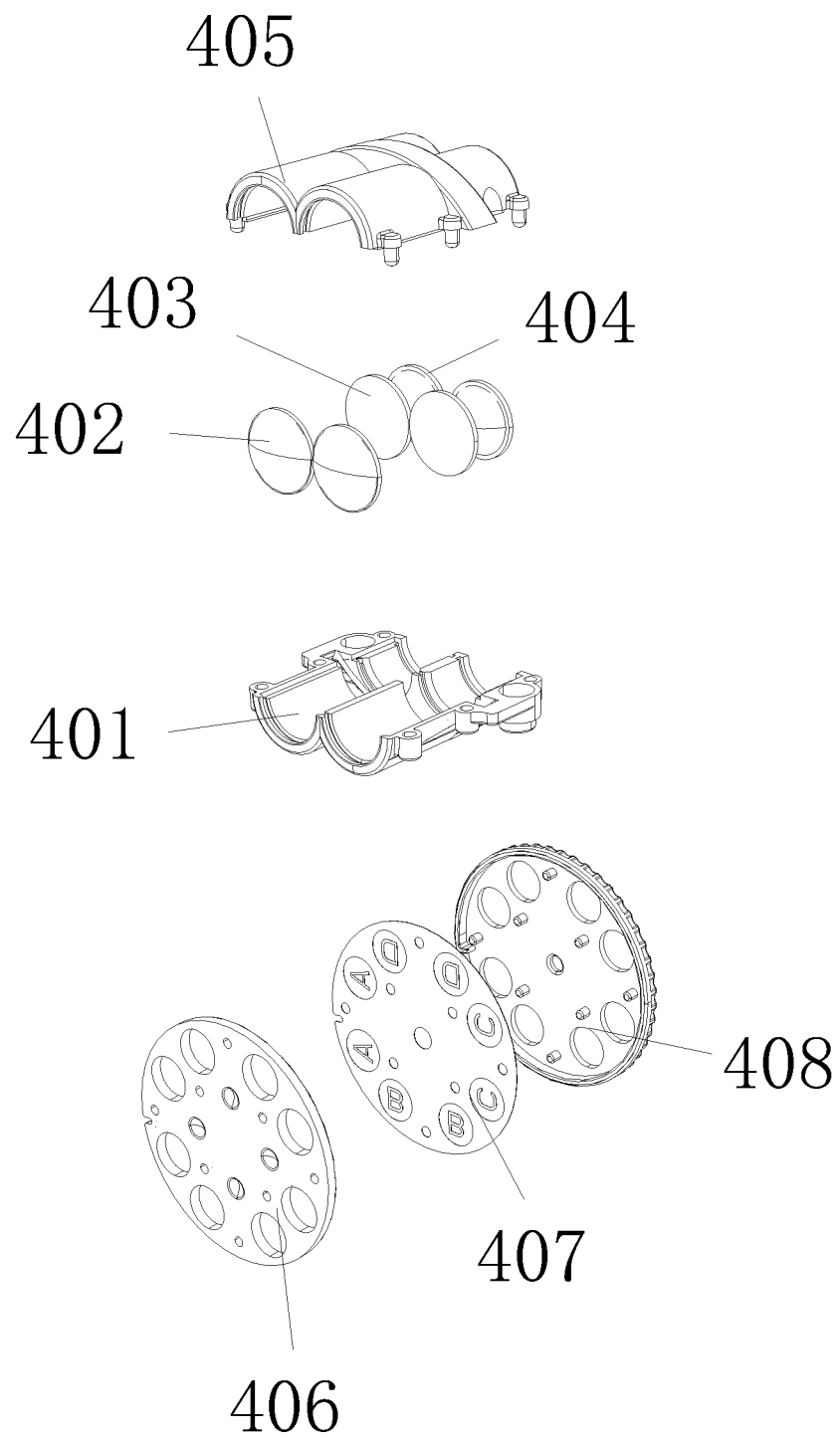
FIG. 3 is an exploded structure diagram of a projection mechanism according to the present disclosure.
Figure 4:
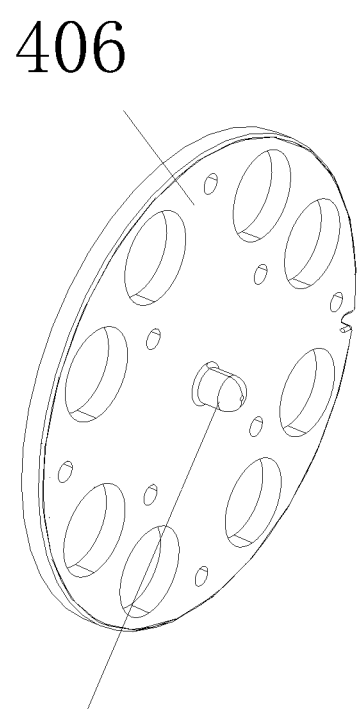
FIG. 4 is a structure diagram of a first clamp according to the present disclosure.
Figure 5:
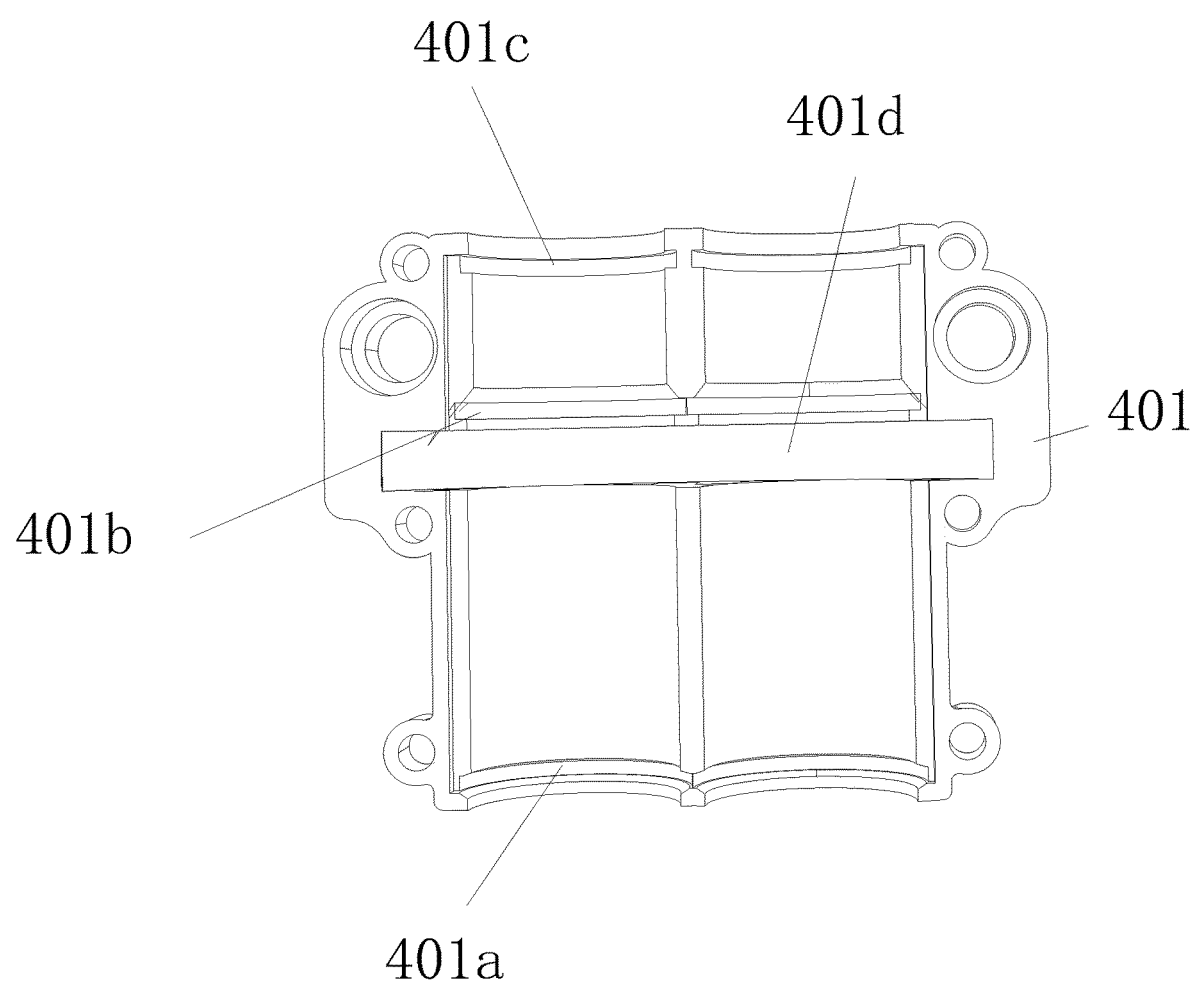
FIG. 5 is a vertical view of a first outer shell according to the present disclosure.

Referring to FIG. 1 to FIG. 5, the present disclosure provides a technical solution as follows: a projection toy includes a top housing 1. A bottom housing 13 is fixedly connected to the top housing 1. A projection mechanism 4 is fixedly mounted between the top housing 1 and the bottom housing 13. An LED lamp panel 9 is fixedly mounted on one side of the projection mechanism 4 between the top housing 1 and the bottom housing 13. An end, away from the LED lamp panel 9, of the projection mechanism 4 is clamped in a limiting enclosure 5. The limiting enclosure 5 is fixedly mounted at one end of a first cover 6. A second cover 7 is fixedly connected to the first cover 6. A decorative cover 8 is fixedly mounted on the second cover 7. The first cover 6 is fixedly mounted at one end of the top housing 1 and one end of the bottom housing 13 on a side away from the decorative cover 8.

The projection mechanism 4 includes a first outer shell 401 and a first clamp 406. Two first clamping grooves 401a are formed in one end of the first outer shell 401, while two second clamping grooves 401b and two third clamping grooves 401c are formed in the other end of the first outer shell 401. A rotating groove 401d is formed in a central position of the first outer shell 401. A plane lens 402 is clamped in each of the two first clamping grooves 401a, while a first convex lens 403 is clamped in each of the two second clamping grooves 401b and a second convex lens 404 is clamped in each of the two third clamping grooves 401c. In the rotating groove 401d, a rotating shaft 406a is fixedly disposed on one side of the first clamp 406. The rotating shaft 406a fixedly extends through a film rotating disc 407 and a second clamp 408 and is rotatably connected to an inner wall of the rotating groove 401d. The first clamp 406 and the second clamp 408 both extend through a moving opening 101 formed at the top of the top housing 1 and are situated above the top housing 1.

In this embodiment, the adjacent first convex lens 403 and second convex lens 404 are disposed symmetric to each other, and convex ends of the first convex lens 403 and the second convex lens 404 are oriented toward each other.

In this embodiment, a stop collar 2 is further embedded within the top housing 1. A power key 3 and a light switching key 301 are embedded within the stop collar 2. A triggering end of the power key 3 extends through the top housing 1 and is situated outside the top housing 1.

In this embodiment, one end, away from the top housing 1, of the power key 3 is bonded to a power button on an integrated switch circuit board 10. The light switching key 301 is bonded to a switching button on the integrated switch circuit board 10. The integrated switch circuit board 10 is fixedly mounted at the bottom of a battery holder 12 by means of a clamping plate 11. The integrated switch circuit board 10 is electrically connected to a wiring terminal in the battery holder 12. The integrated switch circuit board 10 is also electrically connected to the LED lamp panel 9.

In this embodiment, a top end of the battery holder 12 is fixedly mounted on an inner wall of the bottom housing 13. A lid 14 matching the battery holder 12 is clamped to the bottom housing 13.

In this embodiment, two second convex lenses 404, two first convex lenses 403 and two plane lenses 402 are symmetrically disposed on two sides of the first outer shell 401, and axes of each plane lens 402, each first convex lens 403 and each second convex lens 404 located on a same side of the first outer shell 401 coincide.

The method of use and advantages of the present disclosure are described below. When such a projection toy is used, the working process is as follows:

As shown in FIG. 1, FIG. 2, FIG. 3, FIG. 4 and FIG. 5, a battery is placed in the battery holder 12 to supply power. The power key 3 is pressed to power on the toy. Subsequently, the LED lamp panel 9 starts to operate. Light emitted by the LED lamp panel 9 is condensed by the first convex lenses 403 and the second convex lenses 404 on both sides such that the distance of projection is increased and the pattern projected is also enlarged. When the projection light passes through the plane lenses 402 and a film on the film rotating disc 407, the pattern on the film is projected by the light. When there is a need to change the pattern, the second clamp 408 is rotated, and the second clamp 408 then causes the film rotating disc 407 to rotate, thereby completing the operation of changing the pattern. By pressing the light switching key 301, different light-emitting points of the LED lamp panel 9 can be controlled to operate such that different patterns can be projected. Four modes are provided for selection. When the power is switched on normally, only one of LEDs on the LED lamp panel 9 is lit up to project a pattern. After the light switching key 301 is pressed, the other Led on the LED lamp panel 9 is lit up and the first LED goes out such that the pattern is changed to another pattern. After the light switching key 301 is pressed again, two LEDs on the LED lamp panel 9 are lit up and go out alternately such that two patterns are displayed alternately. After the light switching key 301 is finally pressed, the two LEDs on the LED lamp panel 9 are lit up and go out alternately at an increased frequency such that rapid alternate display is achieved. As a matter of course, related circuits for realizing the four modes and circuit control are implemented by circuits and a controller on the integrated switch circuit board 10. The circuits and the controller on the integrated switch circuit board 10 belong to the prior art, which can be readily implemented by a person skilled in the art. Thus, the structure and the working principle of such circuits and controller will not be redundantly described herein.

The foregoing displays and describes the basic principles, the main features and the advantages of the present disclosure. It should be understood by those skilled in the art that the present disclosure is not limited by the aforementioned embodiments. The aforementioned embodiments and those described in the description are merely preferred embodiments of the present disclosure and not meant to limit the present disclosure. Various changes and modifications may be made to the present disclosure without departing from the spirit and scope of the present disclosure w. Such changes and modifications all fall within the claimed scope of the present disclosure. The protection scope of the present disclosure is defined by the appended claims and equivalents thereof.

What is claimed is:

1. A projection toy, comprising a top housing (1), wherein a bottom housing (13) is fixedly connected to the top housing (1); a projection mechanism (4) is fixedly mounted between the top housing (1) and the bottom housing (13); a light-emitting diode (LED) lamp panel (9) is fixedly mounted on one side of the projection mechanism (4) between the top housing (1) and the bottom housing (13); an end, away from the LED lamp panel (9), of the projection mechanism (4) is clamped in a limiting enclosure (5); the limiting enclosure (5) is fixedly mounted at one end of a first cover (6); a second cover (7) is fixedly connected to the first cover (6); a decorative cover (8) is fixedly mounted on the second cover (7); the first cover (6) is fixedly mounted at one end of the top housing (1) and one end of the bottom housing (13) on a side away from the decorative cover (8);

the projection mechanism (4) comprises a first outer shell (401) and a first clamp (406); two first clamping grooves (401a) are formed in one end of the first outer shell (401), while two second clamping grooves (401b) and two third clamping grooves (401c) are formed in the other end of the first outer shell (401); a rotating groove (401d) is formed in a central position of the first outer shell (401); a plane lens (402) is clamped in each of the two first clamping grooves (401a), while a first convex lens (403) is clamped in each of the two second clamping grooves (401b) and a second convex lens (404) is clamped in each of the two third clamping grooves (401c); in the rotating groove (401d), a rotating shaft (406a) is fixedly disposed on one side of the first clamp (406); the rotating shaft (406a) fixedly extends through a film rotating disc (407) and a second clamp (408) and is rotatably connected to an inner wall of the rotating groove (401d); and the first clamp (406) and the second clamp (408) both extend through a moving opening (101) formed at the top of the top housing (1) and are situated above the top housing (1).

2. The projection toy according to claim 1, wherein the adjacent first convex lens (403) and second convex lens (404) are disposed symmetric to each other, and convex ends of the first convex lens (403) and the second convex lens (404) are oriented toward each other.

3. The projection toy according to claim 1, wherein a stop collar (2) is further embedded within the top housing (1); a power key (3) and a light switching key (301) are embedded within the stop collar (2); and a triggering end of the power key (3) extends through the top housing (1) and is situated outside the top housing (1).

4. The projection toy according to claim 3, wherein one end, away from the top housing (1), of the power key (3) is bonded to a power button on an integrated switch circuit board (10); the light switching key (301) is bonded to a switching button on the integrated switch circuit board (10); the integrated switch circuit board (10) is fixedly mounted at the bottom of a battery holder (12) by means of a clamping plate (11); the integrated switch circuit board (10) is electrically connected to a wiring terminal in the battery holder (12); and the integrated switch circuit board (10) is also electrically connected to the LED lamp panel (9).

5. The projection toy according to claim 4, wherein a top end of the battery holder (12) is fixedly mounted on an inner wall of the bottom housing (13); and a lid (14) matching the battery holder (12) is clamped to the bottom housing (13).

6. The projection toy according to claim 1, wherein the two second convex lenses (404), the two first convex lenses (403) and the two plane lenses (402) are symmetrically disposed on two sides of the first outer shell (401), and axes of each plane lens (402), each first convex lens (403) and each second convex lens (404) located on a same side of the first outer shell (401) coincide.

\* \* \* \* \*